United States Patent
Morgan et al.

(10) Patent No.: US 6,859,828 B1
(45) Date of Patent: *Feb. 22, 2005

(54) BI-DIRECTIONAL TEST SYSTEM FOR NETWORK ANALYSIS

(75) Inventors: William T. Morgan, Santa Rosa, CA (US); Marvin L. Milholland, Redington Shores, FL (US); Brenda D. Coomes, Santa Rosa, CA (US); Gerald R. Green, Santa Rosa, CA (US); Chin-Min Wang, Santa Rosa, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1528 days.

(21) Appl. No.: 08/804,908

(22) Filed: Feb. 25, 1997

(51) Int. Cl.[7] ................................................ G06F 11/00
(52) U.S. Cl. ........................................ 709/224; 714/43
(58) Field of Search .................... 395/183.01, 183.19, 395/185.1, 200.48, 200.49; 348/12, 13, 6, 7, 10

(56) References Cited

U.S. PATENT DOCUMENTS

| | | | | |
|---|---|---|---|---|
| 5,073,822 A | * | 12/1991 | Gumm et al. ............... 358/139 |
| 5,255,086 A | * | 10/1993 | McMullan, Jr. et al. ...... 358/86 |
| 5,302,914 A | * | 4/1994 | Arntz et al. ................. 330/129 |
| 5,574,495 A | * | 11/1996 | Caporizzo ..................... 348/13 |
| 5,585,842 A | * | 12/1996 | Chappell et al. ............. 348/192 |
| 5,600,364 A | * | 2/1997 | Hendricks et al. ............. 348/1 |
| 5,742,591 A | * | 4/1998 | Himayat et al. ............. 370/286 |
| 5,790,533 A | * | 8/1998 | Burke et al. ................. 370/318 |
| 5,847,751 A | * | 12/1998 | Safadi ........................... 348/7 |

* cited by examiner

Primary Examiner—Dung C. Dinh

(57) ABSTRACT

A system for analyzing a bi-directional communication path connecting a headend station to a remote station. The communication path is used for sending and receiving messages. Messages in a forward direction are sent by modulating a carrier at a forward frequency, and messages sent in a return direction are sent by modulating a carrier at a return frequency. The system includes a headend unit which sends a sign-on message in the forward direction from the headend station. The headend unit monitors the return frequency for a response message and measures a power level for signals received at the return frequency during the monitoring operation. The headend unit sends an error message in the forward direction if no response message is received on the return frequency, and the power level is greater than a threshold value. If an error message is sent, the power spectrum in a frequency range including the return frequency is measured and sent as part of the error message. If no response message is detected and the power level is less than threshold, the sign-on message is repeated.

12 Claims, 1 Drawing Sheet

BI-DIRECTIONAL TEST SYSTEM FOR NETWORK ANALYSIS

FIELD OF THE INVENTION

The present invention relates to network test systems, and more particularly, to test systems for analyzing the performance of wide area networks such as cable television networks used to provide bi-directional communications.

BACKGROUND OF THE INVENTION

The high bandwidth inherent in cable television systems makes such systems attractive candidates for providing communication links for accessing the Internet. Cable television systems provide a high bandwidth communication path for delivering information from the cable headend to the cable subscribers. While this bandwidth is currently used primarily for delivering television programming, it can also be used for delivering information received over the Internet.

The typical Internet user requires a much larger incoming bandwidth than outgoing bandwidth. Typically, a user is requesting information from a server on the Internet. The amount of information returned is usually much larger than the message specifying the information. For example, a user requesting a file containing a picture sends a message to the server of only a few hundred bytes of information and receives back a message containing the file which may be hundreds of thousands of bytes of information.

This type of communication is well suited for cable television systems. Such systems have low bandwidth paths from the cable subscribers to the cable headend and high bandwidth paths from the cable headend to the subscriber. The low bandwidth paths are currently for ordering pay-per-view programming.

In principle, the installation of digital services on a cable television system requires only the installation of the appropriate modem at the subscribers location. However, in most systems, the low bandwidth path from the subscriber's premises to the cable headend has not been tested. The cable network is, in general, a tree and branch network with the cable headend at the root node of the tree and the various subscribers at the leaf nodes of the tree. The communications path from the cable headend to the subscriber premises are, in general, known to be functioning properly, since any communications path problems in this direction are detected by the user when he or she attempts to watch television. Further, noise sources at one subscriber's location do not interfere with the reception at a second subscriber's location.

Communications from the subscriber's premises to the cable headend are more problematical. The communications in each direction are isolated from one another; hence, there is no assurance that the path from the subscriber to the cable headend is operational even when it is known that the path from cable headend to the subscriber is functioning properly. The path from the subscriber to the cable headend includes various amplifiers and couplers which also affect the communications in the direction from the subscriber to the cable headend. A failure in one of these components can lead to a failure in the communication path from the subscriber to the cable headend while leaving television reception at the subscriber in tact.

In addition, noise sources at the various subscriber locations are combined in a funneling affect at each branch of the tree structured network. Hence, the cable headend receives a signal that includes the additive noise generated by each subscriber. Hence, a noise source at one subscriber's location can interfere with communications from all subscriber's on the network.

These problems make it difficult to debug a new communication path from the subscriber to the cable headend. A technician debugging a new service connection in the field utilizes a testing system having one component at the cable headend and one component that the technician attaches at different locations in the communications path. The two components attempt to communicate with one another to run various tests designed to isolate problems and align the system amplifiers. If the subscriber component does not receive a response to a message sent by it to the cable headend, the technician has no way of determining if the lack of response is due to noise in the path from the subscriber location to the cable headend, a break in that path, someone has turned the cable headend component off, etc.

Broadly, it is the object of the present invention to provide an improved testing system for bi-directional communication systems.

It is a further object of the present invention to provide a testing system that provides the technician with information about the source of the problem that leads to a lack of response to a message from the subscriber location to the cable headend in broadband communication networks and the like.

These and other objects of the present invention will become apparent to those skilled in the art from the following detailed description of the invention and the accompanying drawings.

SUMMARY OF THE INVENTION

The present invention comprises a system for analyzing a bi-directional communication path connecting a headend station to a remote station. The communication path is used for sending and receiving messages. Messages sent from the headend station are said to move in the forward direction; whereas, messages sent to the headend station are said to move in the return direction. Messages in a forward direction are sent by modulating a carrier at a forward frequency, and messages sent in a return direction are sent by modulating a carrier at a return frequency. The system includes a headend unit which sends a sign-on message in the forward direction from the headend station and a remote unit that responds to the sign-on message. The headend unit monitors the return frequency for a response message and measures a power level for signals received at the return frequency during the monitoring operation. The headend unit sends an error message in the forward direction if no response message is received on the return frequency, and the power level is greater than a threshold value. If an error message is sent, the power spectrum in a frequency range including the return frequency is measured and sent as part of the error message. If no response message is detected and the power level is less than threshold, the sign-on message is repeated. The remote unit monitors the forward communication path for a response to its message. If an error message is detected, the remote unit displays the power spectrum sent in the error message.

DETAILED DESCRIPTION OF THE INVENTION

Figure 1:
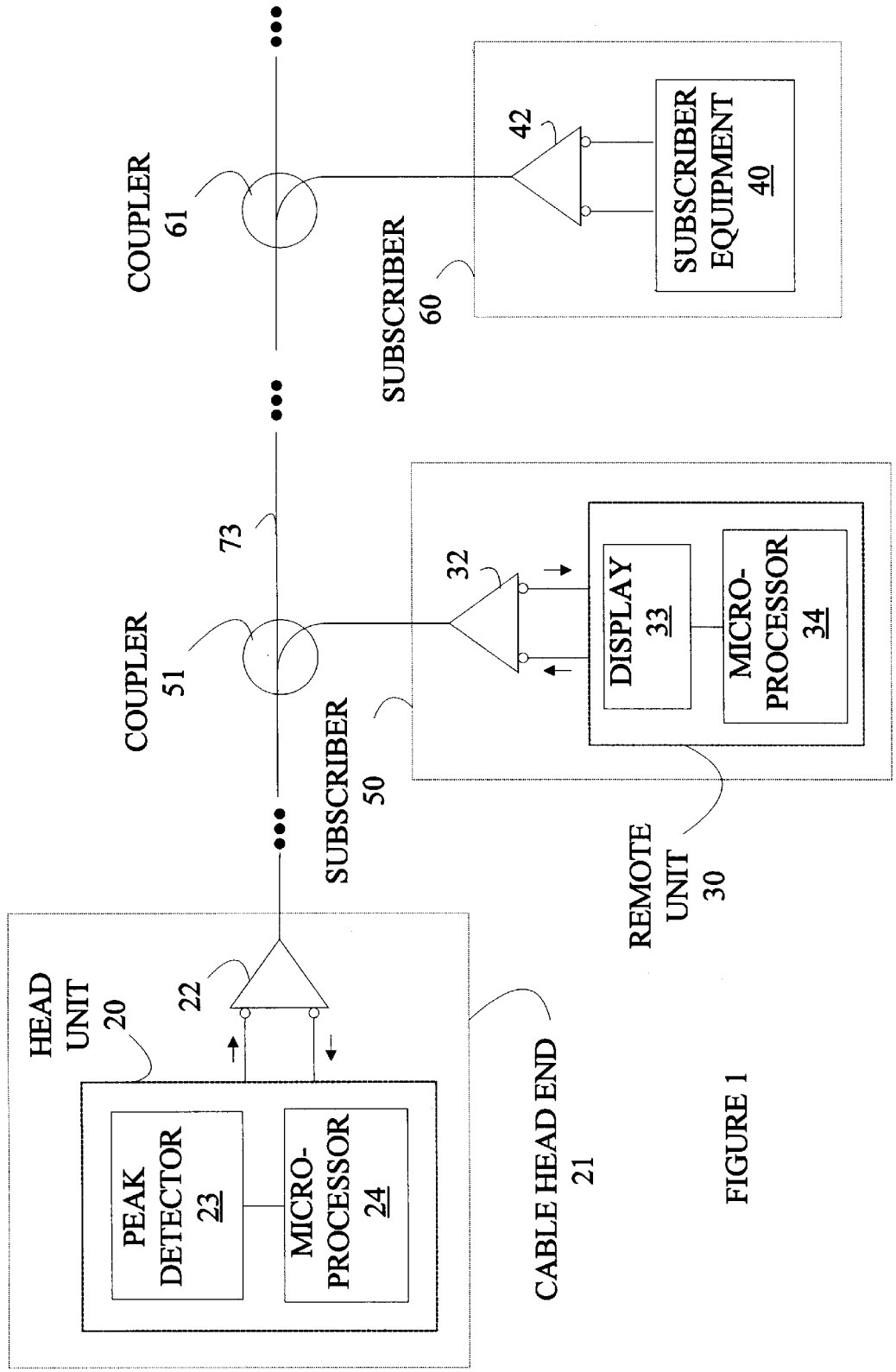
FIG. 1 is a block diagram of a cable system in which a test system according to the present invention is operating.

The present invention may be more easily understood with reference to FIG. 1 which is a block diagram of a cable television network to which the components of the present invention are connected. The cable 73 originates at the cable headend 21. Various subscribers are connected to the cable via couplers. Exemplary couplers are shown at 51 and 61 which connect subscribers 50 and 60, respectively. The cable supports bi-directional communication via interface units. Exemplary interface units are shown at 22, 32, and 42. Communications at each subscriber location are accomplished with the aid of modems such as modem 40.

The present invention includes two types of communication processing units. The first type of unit, referred to as a headend unit, is coupled to the cable at the cable headend. A headend unit is shown at 20. At each subscriber location being tested, a remote unit such as remote unit 30 is connected. The remote units communicate with the headend unit to initiate various tests and provide data from the tests to the service technician.

The headend unit and remote units are preferably constructed using programmable microprocessors as shown at 24 and 34. The various functions discussed below are implemented in software that operates on the microprocessors.

The operation of the present invention is based on the observation that the communication path from the cable headend to the subscriber premises is known to be functioning correctly, since the subscriber is already receiving television programming. Communications from the headend to the subscriber locations will be referred to as taking place in the "forward" direction in the following discussion. The forward direction communications are typically within the 50–550 MHz frequency range of the cable. Similarly, communications from a subscriber location to the headend will be referred to as taking place in the "return" direction. The return direction communications typically occupy the 5–40 MHz frequency range of the cable.

Referring again to FIG. 1, headend unit 20, when operating in the test mode of the present invention, periodically broadcasts a sign-on message and looks for a response during a defined time period with respect to the sign-on message on a specific frequency. Assume that remote unit 30 wishes to sign onto the system. Remote unit 30 then responds with a sign-on message. There are four possibilities from the point of view of headend unit 20. First, headend unit 20 receives a sign-on response in the expected time slot on the expected frequency. In this case, the headend unit responds to the sign-on response and performs tests requested in the response and subsequent messages from the remote unit.

In the other possibilities, headend unit 20 does not detect a sign-on response. There are three possible reasons for the lack of a response, either no response was sent or a response was sent and one of two things happened. Either the return path is not functioning properly, or noise or another carrier interfered with the transmission. Headend unit 20 distinguishes between these possibilities by measuring the power in the return path frequency band specified for responses. When headend unit 20 expects a sign-on message response, it arms an IF peak detector 23 to measure the energy present at the return frequency. If headend unit 20 receives a good message, IF peak detector 23 is reset. If no message is received, headend unit 20 examines the peak detector level to determine if there was sufficient signal level in the return frequency band to interfere with communications in that band. If there was insufficient noise to interfere with communications, headend unit 20 assumes that no response was sent or that the return is not functioning and cycles back to perform another new user poll (sign-on message).

If the peak level detected was sufficient to interfere with communications, headend unit 20 sends a message in the forward direction indicating that the return path had sufficient noise to interfere with communications thereon. In the preferred embodiment of the present invention, the message includes a spectral measurement of the entire return frequency path. That is, headend unit 20 scans the return frequency range and measures the power as a function of frequency in that range. This data is then included in the message sent in the forward direction.

From the point of view of remote unit 30, there are three possible responses to a sign-on message sent by it in the return direction. First, remote unit 30 could detect a message from headend unit 20 indicating that headend unit 20 received its sign-on response. In this case, the return path is functioning properly, and the technician can proceed with various tests involving headend unit 20.

Second, remote unit 30 could detect another sign-on message. In this case, remote unit 30 knows that its response message did not reach headend unit 20 and the communication channel did not have sufficient noise to interfere with communications. This situation indicates that there is a break in the return communication path. The technician then knows that he or she must trace the break.

Third, remote unit 30 could detect an error message which includes the frequency spectrum discussed above. This situation can arise from noise on the return path or from a collision between a response from remote unit 30 and some other remote unit that was also attempting to respond to the sign-on message in the same time slot. The manner in which such collisions are handled will be discussed in more detail below. If the technician determines that the failure of the return communication path is the result of noise, the technician can then search for the source of the noise. The spectrum included in the error message is useful in tracing the source of the noise. The remote unit displays the spectrum to the technician who can then use the spectrum details to identify the source of the noise by comparing the spectra observed at various points on the cable with that received in the error message.

As noted above, a return path communication error can occur as a result of a collision between two or more sign-on response messages. In the preferred embodiment of the present invention, the communication protocol between the headend unit and the remote unit includes a plurality of time slots for the response messages from the remote units. These time slots are defined with reference to the sign-on message sent by the headend unit. Each remote unit wishing to respond to a sign-on message picks one of these time slots using an algorithm based on a pseudo-random number generator. If two remote units happen to pick the same time slot on any given cycle of the sign-on message protocol, a collision occurs; however, a second attempt by each unit to respond to sign-on protocol will most likely result in each of these units picking different time slots and, thus, avoiding a collision.

Accordingly, in the preferred embodiment of the present invention, a remote unit that sees an error message in the forward direction after it responds to the sign-on message must determine whether the error is the result of a collision or noise. The remote unit can make this determination by repeating its response message on the next cycle. If the remote unit does not succeed in establishing communication with the headend unit after a predetermined number of attempts, the remote unit assumes that noise, and not response collisions, is the source of the problem.

In the preferred embodiment of the present invention, display 33 in each of the remote units includes indicators that communicate the status of the cable paths to the technician. There are a number of possible states for the system as noted above: the communications path is operating in both directions; the communications path is functioning in the forward direction only; the communications path is functioning in the return direction only; the headend unit is off; the return direction is broken; the return direction is failing because of noise or collisions. In the preferred embodiment of the present invention, an indicator is provided for each of these states so that the technician can quickly determine the state of the cable.

While the present invention has been described in terms of a cable television network, it will be apparent to those skilled in the art that the teachings of the present invention may be applied to any broadband bi-directional communication path connecting a "headend" station to a "remote" station. Further, the frequencies described above are intended to provide examples of communication frequencies commonly used in television cable networks. However, it will be apparent to those skilled in the art that the present invention may be practiced with a wide range of frequency assignments.

In the above described embodiments of the present invention, the remote unit responds on a return frequency. In the preferred embodiment of the present invention, the return frequency is specified in the sign-on message. This allows the headend unit to move the return frequency in the event that another frequency is available and the headend unit determines that there is excessive noise at the current return frequency. This approach also has the advantage of not requiring the remote units to be programmed for a specific return frequency. The remote unit only needs to know the forward frequency to commence communications. Since there are a large number of remote units for each headend unit, any reduction in the cost of a remote unit is very desirable.

The above embodiments of the present invention have been described in terms of the remote unit being connected at the subscriber premises. However, it will be apparent to those skilled in the art that the remote unit may be connected at any point in the network to provide information about the network at the location in question.

Various modifications to the present invention will become apparent to those skilled in the art from the foregoing description and accompanying drawings. Accordingly, the present invention is to be limited solely by the scope of the following claims.

What is claimed is:

1. A method for analyzing a bi-directional communication path connecting a headend station to a remote station, said communication path being used for sending and receiving messages, messages in a forward direction being sent by modulating a carrier at a forward frequency and messages sent in a return direction being sent by modulating a carrier at a return frequency, said method comprising the steps of:
   sending a sign-on message in said forward direction from said headend station;
   monitoring said return frequency for a response message, said response message being sent in response to said sign-on message being received by a remote unit connected to said bi-directional directional communication path, said monitoring step including determining a power level for signals received at said return frequency; and
   sending an error message in said forward direction if no response message is received on said return frequency and said power level is greater than a threshold value.

2. The method of claim 1 wherein said step of determining a power level comprises detecting the peak power received in a time interval determined with reference to said sending of said sign-on message.

3. The method of claim 1 wherein said step of sending an error message further comprises the step of measuring a power spectrum in a frequency range and sending said measured power spectrum in said error message.

4. The method of claim 1 further comprising the step of repeating said step of sending said sign-on message if no response message is detected and said power level is less than threshold.

5. The method of claim 1 wherein said return frequency is specified in said sign-on message.

6. A headend unit for analyzing a bi-directional communication path connecting a headend station to a remote station, said communication path being used for sending and receiving messages, messages in a forward direction being sent by modulating a carrier at a forward frequency and messages sent in a return direction being sent by modulating a carrier at a return frequency, said headend unit comprising:
   means for sending a sign-on message in said forward direction from said headend station;
   means for monitoring said return frequency for a response message, said response message being sent in response to said sign-on message being received by a remote unit connected to said bi-directional communication path, said monitoring means including means for determining a power level for signals received at said return frequency; and
   means for sending an error message in said forward direction if no response message is received on said return frequency and said power level is greater than a threshold value.

7. The headend unit of claim 6 wherein said means for determining a power level comprises a peak power detector.

8. The headend unit of claim 6 further comprising a power spectrum analyzer for measuring a power spectrum in a frequency range.

9. The headend unit of claim 8 further comprising means for sending said measured power spectrum in said error message.

10. The headend unit of claim 6 wherein said means for sending a sign-on message further comprises means for specifying said return frequency in said sign-on message.

11. A remote unit for analyzing a bi-directional communication path connecting a headend station to a remote station, said communication path being used for sending and receiving messages, messages in a forward direction being sent by modulating a carrier at a forward frequency and messages sent in a return direction being sent by modulating a carrier at a return frequency, said remote unit comprising:
   means for monitoring said forward frequency for a sign-on message;
   means for sending a response message in response to said sign-on message; and
   means for monitoring said forward frequency for an error message including a frequency spectrum, and means for displaying said frequency spectrum.

12. The remote unit of claim 11 wherein said means for sending a response message comprises means for determining a response frequency from said sign-on message.

* * * * *